United States Patent
Yanagibayashi et al.

(10) Patent No.: US 10,995,740 B2
(45) Date of Patent: May 4, 2021

(54) SWITCHING VALVE, BINARY PUMP, AND LIQUID CHROMATOGRAPH WITH BINARY PUMP

(71) Applicant: Shimadzu Corporation, Kyoto (JP)

(72) Inventors: Jun Yanagibayashi, Kyoto (JP); Shinya Imamura, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/334,288

(22) PCT Filed: Jun. 30, 2017

(86) PCT No.: PCT/JP2017/024093
§ 371 (c)(1),
(2) Date: Mar. 18, 2019

(87) PCT Pub. No.: WO2018/055866
PCT Pub. Date: Mar. 29, 2018

(65) Prior Publication Data
US 2019/0211813 A1    Jul. 11, 2019

(30) Foreign Application Priority Data
Sep. 26, 2016 (JP) .............................. JP2016-187243

(51) Int. Cl.
*F04B 13/02* (2006.01)
*G01N 30/38* (2006.01)
(Continued)

(52) U.S. Cl.
CPC .............. *F04B 13/02* (2013.01); *F04B 23/06* (2013.01); *F04B 53/10* (2013.01); *G01N 30/32* (2013.01);
(Continued)

(58) Field of Classification Search
CPC .......... F04B 13/02; F04B 23/06; F04B 53/10; G01N 30/32; G01N 30/34; G01N 30/38;
(Continued)

(56) References Cited

U.S. PATENT DOCUMENTS 3,477,207 A * 11/1969 Auger .................... G01N 30/20
96/104
4,625,569 A * 12/1986 Toei .................... G01N 35/1097
73/863.72
(Continued)

FOREIGN PATENT DOCUMENTS

DE    102014005739 A1    10/2014
EP      2 690 328 A1     1/2014
(Continued)

OTHER PUBLICATIONS

Office Action for corresponding Chinese Patent Application No. CN 201780029183.1, dated Jun. 25, 2019.
(Continued)

*Primary Examiner* — William M McCalister
(74) *Attorney, Agent, or Firm* — Muir Patent Law, PLLC

(57) ABSTRACT

A switching valve is used in a binary pump. The switching valve is provided with a first liquid delivery port to which a first pump unit is connected, a second liquid delivery port to which a second pump unit is connected, and an output port leading to an output unit that outputs a liquid to be delivered. The switching valve is configured so as to be switched to any one of the following states: a first state in which the first liquid delivery port is connected to the output port and the second liquid delivery port is not connected to any port; a second state in which the second liquid delivery port is connected to the output port and the first liquid delivery port is not connected to any port; and a third state in which both
(Continued)

the first liquid delivery port and the second liquid delivery port are connected to the output port.

11 Claims, 8 Drawing Sheets

(51) Int. Cl.
  *G01N 30/32* (2006.01)
  *F04B 23/06* (2006.01)
  *F04B 53/10* (2006.01)
  *G01N 30/86* (2006.01)
  *G01N 30/34* (2006.01)

(52) U.S. Cl.
  CPC ............ *G01N 30/86* (2013.01); *G01N 30/34* (2013.01); *G01N 30/38* (2013.01); *G01N 2030/326* (2013.01); *G01N 2030/328* (2013.01); *Y10T 137/86107* (2015.04); *Y10T 137/86501* (2015.04); *Y10T 137/86863* (2015.04)

(58) Field of Classification Search
  CPC ............ G01N 30/86; G01N 2030/326; G01N 2030/328; Y10T 137/86107; Y10T 137/86501; Y10T 137/86863; Y10T 137/86871
  USPC ............ 137/565.26, 625.11, 625.46, 625.47
  See application file for complete search history.

(56) References Cited

U.S. PATENT DOCUMENTS

| | | | |
|---|---|---|---|
| 5,010,921 A * | 4/1991 | Nohl ............... | F16K 11/074 137/625.11 |
| 5,304,800 A * | 4/1994 | Hoots .............. | G01M 3/228 250/302 |
| 5,910,462 A * | 6/1999 | Gani ............... | B01J 41/13 264/42 |
| 6,672,336 B2 * | 1/2004 | Nichols ............ | F16K 11/074 137/625.11 |
| 6,874,354 B2 * | 4/2005 | Cueni .............. | G01N 30/20 73/61.55 |
| 7,213,615 B2 | 5/2007 | Cueni et al. | |
| 7,344,766 B1 * | 3/2008 | Sorensen .......... | B01L 3/50825 215/355 |
| 7,574,901 B2 * | 8/2009 | Iwata .............. | G01N 30/20 137/625.46 |
| 8,613,607 B2 * | 12/2013 | Darsey ............. | F01N 1/16 417/540 |
| 8,960,231 B2 * | 2/2015 | Picha .............. | G01N 30/20 137/625.46 |
| 9,194,504 B2 * | 11/2015 | Cormier ........... | F16K 11/0655 |
| 9,739,383 B2 * | 8/2017 | Nichols ........... | G01N 30/20 |
| 2004/0108273 A1 | 6/2004 | Richardson et al. | |
| 2006/0191581 A1 * | 8/2006 | Cueni ............. | F16K 11/0743 137/625.46 |
| 2006/0219618 A1 | 10/2006 | Witt et al. | |
| 2006/0261964 A1 * | 11/2006 | Maetzke .......... | G01F 23/2967 340/605 |
| 2007/0107499 A1 * | 5/2007 | Iwata ............. | G01N 30/34 73/61.56 |
| 2008/0080981 A1 | 4/2008 | Witt et al. | |
| 2009/0120166 A1 * | 5/2009 | Weitz ............. | G01M 3/16 73/46 |
| 2009/0205409 A1 * | 8/2009 | Ciavarini ......... | G01N 30/34 73/61.56 |
| 2011/0116973 A1 | 5/2011 | Choikhet | |
| 2013/0219999 A1 * | 8/2013 | Casey ............. | G01N 30/22 73/61.48 |
| 2014/0130580 A1 * | 5/2014 | Mcadams .......... | G01N 30/00 73/61.52 |
| 2014/0261868 A1 * | 9/2014 | Wrench ........... | B67D 7/0255 141/4 |
| 2014/0318224 A1 | 10/2014 | Onoda et al. | |
| 2015/0204823 A1 * | 7/2015 | Casey ............. | G01N 30/16 73/61.55 |
| 2015/0329519 A1 * | 11/2015 | Kates ............. | C07K 5/06104 514/21.91 |
| 2017/0343520 A1 * | 11/2017 | Ortmann .......... | G01N 30/36 |

FOREIGN PATENT DOCUMENTS

| | | |
|---|---|---|
| JP | 2006-284556 A | 10/2006 |
| JP | 2007-327847 A | 12/2007 |
| JP | 2014-020541 A | 2/2014 |
| WO | 2015123309 A1 | 8/2015 |

OTHER PUBLICATIONS

Extended European Search Report, dated Nov. 22, 2019, for the counterpart European Patent Application EP 17852647.1.

First Examination Report, dated Dec. 16, 2020, issued from the Indian Patent Office for the corresponding Indian Patent Application No. 201947016341 (5 pages).

\* cited by examiner

SWITCHING VALVE, BINARY PUMP, AND LIQUID CHROMATOGRAPH WITH BINARY PUMP

TECHNICAL FIELD

The present invention relates to a switching valve for switching a connection between a plurality of ports by rotation of a rotor, a binary pump using the switching valve, and a liquid chromatograph equipped with the binary pump as a liquid delivery device for delivering a mobile phase.

BACKGROUND ART

In liquid chromatography and supercritical fluid chromatography, a gradient analysis for performing an analysis while changing a composition of a mobile phase temporally is executed in some cases. In a gradient analysis, a composition of a mobile phase is temporally changed by delivering two kinds of solvents and changing the respective flow rates. A binary pump is known as such a liquid delivery device for a gradient analysis. The binary pump is equipped with two pump units, and is configured to merge the liquids delivered from each pump unit and output the merged liquid (see Patent Document 1).

PRIOR ART

Patent Document

Patent Document 1: U.S. Pat. No. 7,670,480

SUMMARY OF THE INVENTION

Problems to be Solved by the Invention

In some case of gradient analyses using a binary pump where one of solvents is being delivered, due to the system pressure increase, the solvent may flow back to a flow path of the other side of a pump unit not in operation. When such a backward flow occurs, a delay in liquid delivery occurs at the time of activating a pump unit which has been stopped in operation to deliver the other solvent afterward. This causes a problem that a mobile phase having a desired mixing ratio cannot be obtained. Poor mixing precision of a mobile phase causes deterioration of separation or analysis reproducibility.

Under the circumstance, the present invention aims to improve liquid delivery accuracy of each solvent by a binary pump.

Means for Solving the Problems

The switching valve according to the present invention is used for the above-mentioned binary pump. The switching valve is provided with a first liquid delivery port to which a first pump unit is connected, a second liquid delivery port to which a second pump unit is connected, and an output port leading to an output unit that outputs a liquid to be delivered. The switching valve is configured so as to be switched to any one of the following states: a first state in which the first liquid delivery port is connected to the output port and the second liquid delivery port is not connected to any port; a second state in which the second liquid delivery port is connected to the output port and the first liquid delivery port is not connected to any port; and a third state in which both the first liquid delivery port and the second liquid delivery port are connected to the output port.

It has been conventionally proposed to incorporate a 6-way valve in a binary pump. For example, in Japanese Unexamined Patent Application Publication No. 2007-327847, it has been disclosed that a 6-way valve is incorporated in a binary pump that delivers two kinds of liquids and the 6-way valve is configured to be switched to either one of the following states: a state in which only one pump unit (first pump unit) is connected to an output port; and a state in which both pump units (first pump unit and second pump unit) are connected to the output port at the same time. In the disclosed configuration, since the second pump unit is not connected to the output port while only the first pump unit is connected to the output port, backward flow of the liquid to the second pump unit side can be prevented. On the other hand, in this configuration, it cannot be set to a state in which only the second pump unit is connected to the output port. For this reason, backward flow cannot be prevented in a gradient analysis which starts from a state in which the liquid delivery flow rate from the first pump unit is 0% and the liquid delivery flow rate from the second pump unit is 100%. The switching valve of the present invention is different from a normal 6-way valve in that it can be switched to either a state (first state) in which only the first pump unit is connected to the output port or a state (second state) in which only the second pump unit is connected to the output port.

Also, in the configuration in which a normal 6-way valve is incorporated in a binary pump as described above, when switching between the state in which only the first pump unit is connected to the output unit and the state in which both the pump units are connected to the output port, the connection between the first pump unit and the output port is temporarily interrupted.

In contrast, in the switching valve of the present invention, it is preferably configured such that it can be switched between the first state and the third state without interrupting the connection between the first liquid delivery port and the output port and it can be switched between the second state and the third state without interrupting the connecting between the second liquid delivery port and the output port. In that case, it is possible to continuously carry out liquid delivery at the time of switching the state, which makes it possible to perform stable solution delivery. Furthermore, in the configuration in which a normal 6-way valve is incorporated in a binary pump as described above, the accuracy of the composition of the mobile phase is impaired during the time from the second pump unit starts liquid delivery until the flow path between the output port and the confluence part is replaced by the liquid delivered by the second pump. On the other hand, in the switching valve of the present invention, there occurs no delay for liquid replacement of the flow path, and therefore the accuracy of the composition of the mobile phase is not impaired.

In the switching valve of the present invention, it may be configured such that the output port includes two output ports, i.e., a first output port and a second output port, the first liquid delivery port is connected to the first output port in the first state and the third state, and the second liquid delivery port is connected to the second output port in the second state and the third state.

Further, it may be configured such that the switching valve is provided with a drain port leading to the drain and can be switched to a fourth state in which at least either the first liquid delivery port or the second liquid delivery port is connected to the drain port. With this, by switching the switching valve to the fourth state, it is possible to connect the first pump unit or the second pump unit to the drain to perform purging in the system from the pump unit to the switching valve.

The binary pump according to the present invention is provided with a first pump unit, a second pump unit provided separately from the first pump unit, an output unit that outputs a liquid to be delivered, and the aforementioned switching valve. The switching valve is provided with a first liquid delivery port to which the first pump unit is connected, and a second liquid delivery port to which the second pump unit is connected, and an output port leading to the output unit. The switching valve is configured to be switched to any one of the following states: a first state in which the first liquid delivery port is connected to the output port and the second liquid delivery port is not connected to any port; a second state in which the second liquid delivery port is connected to the output port and the first liquid delivery port is not connected to any port; and a third state in which both the first liquid delivery port and the second liquid delivery port are connected to the output port.

It is preferable that the binary pump be further provided with a first pressure sensor configured to detect a system pressure between the first pump unit and the switching valve and a second pressure sensor configured to detect a system pressure between the second pump unit and the switching valve. In this case, it becomes possible to perform the operation control of each pump unit based on the detected value while monitoring the system pressure between the first pump unit and the switching valve and the system pressure between the second pump unit and the switching valve, which enables improvement of the stability of liquid delivery.

As an example of the operation control of each pump unit based on the detection values by the first pressure sensor and the second pressure sensor, a pre-pressurizing operation can be exemplified. As a specific example of the configuration of the binary pump configured to perform the pre-pressurizing operation, the configuration equipped with the following pre-pressurizing operation unit can be exemplified. The pre-pressurizing operation unit is configured to perform: a first pre-pressurizing operation for operating the first pump unit based on the output of the first pressure sensor so that a pressure detected by the first sensor approaches the system pressure in the second state of the switching valve; and a second pre-pressurizing operation for operating the second pump unit based on the output of the second pressure sensor so that the pressure detected by the second sensor approaches the system pressure in the first state of the switching valve. With this pre-pressurizing operation unit, the system pressure on the side of the pump unit which is suspended in operation is maintained at a pressure close to the system pressure (liquid delivery pressure of the operating pump unit). Therefore, the backward flow of the liquid at the moment when the pump unit which has been suspended in operation is connected to the output port can be suppressed, which in turn can suppress disturbance of the liquid delivery flow rate and decrease of the liquid delivery accuracy.

As a further preferred embodiment, the pre-pressurizing operation unit is configured to operate the first pump unit so that the pressure detected by the first sensor becomes approximately the same as the system pressure in the second state of the switching valve and operate the second pump unit based on the output of the second pressure sensor so that the pressure detected by the second sensor becomes approximately the same as the system pressure in the first state of the switching valve. The aforementioned "approximately the same" includes the meaning of not only the case in which the pressures are completely identical but also the case in which there is a small pressure difference that does not affect the liquid delivery accuracy. With this, the system pressure on the side of the pump unit which is suspended in operation is maintained at the same degree of pressure as the system pressure, which further improves the effect of suppressing the backward flow of the liquid at the moment when the pump unit which has been suspended in operation is connected to the output port.

By the way, when the switching valve is in the first state or the second state, the flow path on the side of the pump unit in which the connection with the output port is blocked is a closed system. The pressure of the flow path will be kept constant and should not spontaneously decrease. Therefore, for example when the system pressure is constant, if the pump unit in which the connection to the output port is blocked is in a pre-pressurizing operation to increase the system pressure, which means that the pressure in the flow path, which should be a closed system, spontaneously decreases. As a cause of the spontaneous pressure drop in the closed flow path, a liquid leakage can be conceivable. That is, based on the operation of each pump unit in the pre-pressurizing operation, the occurrence of liquid leakage and its leakage amount can be detected.

Under the circumstances, the binary pump of the present invention may be further provided with a leakage amount calculation unit configured to calculate the leakage amount based on the liquid delivery amount by the first pump unit or the second pump unit in the pre-pressurizing operation.

Furthermore, it is preferable to issue a warning when a leakage amount is detected by the leakage amount calculation unit. With this, a user can easily recognize the occurrence of liquid leakage. The detection of leakage amount can be done based on, for example, a threshold value, and it may be configured to issue a warning when the liquid delivery amount by the first pump unit or the second pump unit in the pre-pressurizing operation exceeds a preset threshold value. As a method of warning to be issued upon detection of liquid leakage, a method of displaying the warning on a display unit such as a liquid crystal display provided or connected to a binary pump or a liquid chromatograph or a method of generating a warning sound may be considered. Further, it may be configured such that when a warning is issued, the warning history is stored in a recording unit, such as, e.g., a data file.

Also, due to liquid delivery conditions or occurrence of leakage in an analytical column, etc., a system pressure decreases in some cases. In such a case, when the flow path of one of the pump units is shut off from the output unit to make it a closed system, the pressure in the flow path becomes relatively higher than the system pressure in accordance with the decrease in the system pressure. When the pump unit is connected to the output unit in that condition, the liquid in the flow path on the pump unit side will be suddenly delivered due to the pressure difference, which causes problems such that the composition of the mobile phase is affected or the liquid delivery flow rate becomes unstable.

Therefore, in the binary pump of the present invention, when the pressure detected by the first pressure sensor is greater than the system pressure in the second state, when the pressure detected by the second pressure sensor is greater than the system pressure in the first state, and when the system pressure continuously decreases in the third state, it is preferable that a pressure releasing unit configured to set the switching valve to the third state be further provided. With this, it is possible to prevent the occurrence of the above-mentioned problem.

The liquid chromatograph according to the present invention is provided with an analysis flow path, the above-mentioned binary pump configured to deliver a mobile phase in the analysis flow path, a sample injection unit provided on a downstream side of the binary pump on the analysis flow path and configured to inject a sample into the analysis flow, an analytical column provided on a further downstream side of the sample injection unit on the analysis flow path and configured to separate the sample injected into the analysis flow path by the sample injection unit for each component, and a detector provided on a further downstream side of the analytical column on the analysis flow path and configured to detect a component separated by the analytical column.

Effects of the Invention

In the switching valve according to the present invention, it is configured to be switched to any one of the following states: a first state in which a first liquid delivery port is connected to an output port and a second liquid delivery port is not connected to any port; a second state in which the second liquid delivery port is connected to the output port and the first liquid delivery port is not connected to any port; and a third state in which both the first liquid delivery port the and second liquid delivery port are connected to the output port. By using this switching valve for a binary pump, it is possible to prevent a backward flow of a liquid toward a pump unit in which a liquid delivery operation is suspended, which can improve the liquid delivery accuracy.

In the binary pump according to the present invention, it is configured to switch the connection state between each pump unit and the output unit by using the above-mentioned switching valve. Therefore, it is possible to prevent a backward flow of the liquid toward the pump unit in which a liquid delivery is suspended, which improves the liquid delivery accuracy.

In the liquid chromatograph according to the present invention, it is configured to deliver the mobile phase by using the above-described binary pump. For this reason, the composition of the solvent constituting the mobile phase can be accurately controlled, which in turn can improve the reproducibility of an analysis.

EMBODIMENTS FOR CARRYING OUT THE INVENTION

Hereinafter, with reference to drawings, one embodiment of a switching valve, a binary pump, and a liquid chromatograph according to the present invention will be described.

Figure 1:
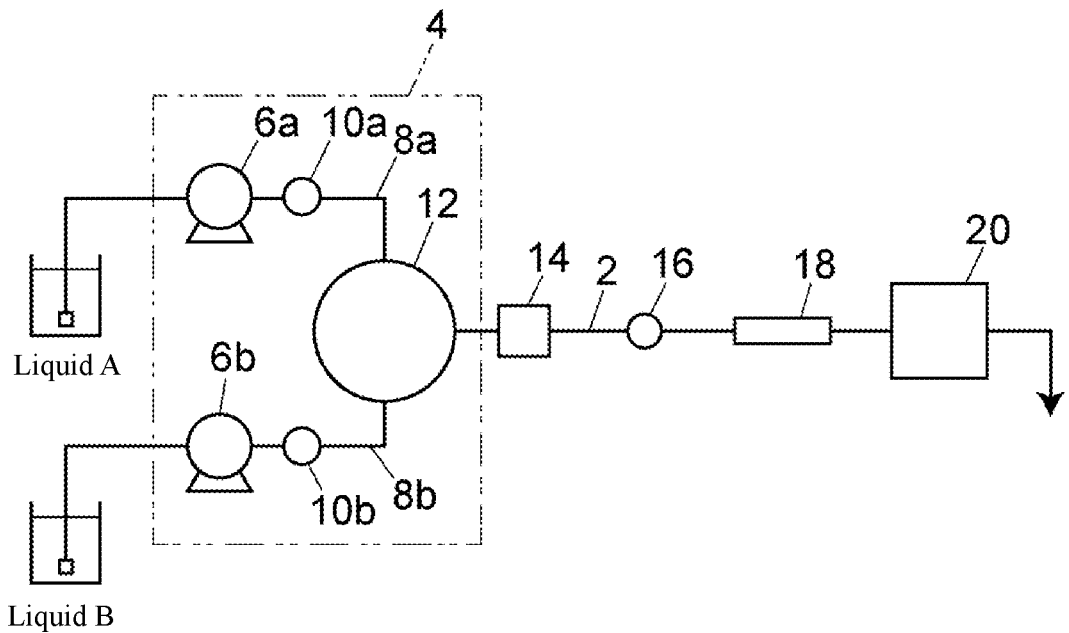
FIG. 1 is a flow path configuration diagram schematically showing an embodiment of a liquid chromatograph.

With reference to FIG. 1, the flow path configuration of the liquid chromatograph of one embodiment will be described.

The liquid chromatograph of this embodiment is provided with an analysis flow path 2, a binary pump 4, a mixer 14, a sample injection unit 16, an analytical column 18, and a detector 20. The binary pump 4 is configured to deliver liquids A and B which are solvents to the mixer 14. The mixer 14 is configured to mix the liquid A and the liquid B delivered by the binary pump 4. The sample injection unit 16 is provided on the downstream side of the mixer 14 on the analysis flow path 2 so as to inject a sample into the analysis flow path 2. The analytical column 18 is provided on a further downstream of the sample injection unit 16 on the analysis flow path 2 so as to separate the sample injected into the analysis flow path 2. The detector 20 is provided on further downstream side of the analytical column 18 on the analysis flow path 2 so as to detect the sample component separated by the analytical column 18.

The binary pump 4 is provided with a first pump unit 6*a* for sucking the liquid A from a container and delivering the liquid and a second pump unit 6*b* for sucking the liquid B from the container and delivering the liquid. The first pump unit 6*a* and the second pump unit 6*b* are connected to mutually different ports of the switching valve 12 via the first liquid delivery flow path 8*a* and the second liquid delivery flow path 8*b*, respectively.

Although the switching valve 12 is depicted schematically in FIG. 1, the switching valve 12 can be switched at least to a first state in which only the first liquid delivery flow path 8*a* is connected to the mixer 14, a second state in which only the second liquid delivery flow path 8*b* is connected to the mixer 14, and a third state in which both the first liquid delivery flow path 8*a* and the second liquid delivery flow path 8*b* are connected to the mixer 14. The pressure sensor 10*a* and the pressure sensor 10*b* are provided on the first liquid delivery flow path 8*a* and on the second liquid delivery flow path 8*b*, respectively.

In FIG. 1, the switching valve 12 and the mixer 14 are depicted as being connected by a single flow path. However, the present invention is not limited to this, and may be configured such that the liquid A and the liquid B are output from separate flow paths and merged and mixed by the mixer 14. In the embodiment shown in FIG. 2 to FIG. 5, and in FIG. 10 to FIG. 13, which will be described later, the liquid A and the liquid B are output to the mixer 14 through separate flow paths. In the embodiments shown in FIG. 6 to FIG. 9 which will be described later, the liquid A and liquid B are output to the mixer 14 through a single flow path.

An example of a more specific configuration of the binary pump 4 will be described with reference to FIG. 2 to FIG. 5.

In the binary pump 4 of this embodiment, a rotary type 6-way valve having six ports a to f is used as the switching valve 12. The six ports a to f are equally arranged at 60 degree intervals on the same circumference. The port a is connected to the first liquid delivery flow path 8a, the port b is connected to the flow path leading to the mixer 14, the port c is connected to the drain, the port d is connected to the second liquid delivery flow path 8b, the port e is connected to the flow path leading to the mixer 14, and the port f is connected to the drain. The port a is served as a first liquid delivery port, and the port d is served as a second liquid delivery port. Further, the port b is served as a first output port, and the port e is served as a second output port. These ports b and e are served as an output unit for outputting the liquid to the mixer 14.

In this embodiment, the pump units 6a and 6b are shown to have a configuration of a series double plunger type. However, the present invention is not limited to this configuration, but allows a configuration of any type, such as, e.g., a parallel double plunger system, as long as a liquid can be delivered.

A damper 22a is provided on the switching valve 12 side of the pressure sensor 10a on the first liquid delivery flow path 8a which connects the pump unit 6a and the port a of the switching valve 12. Further, a damper 22b is provided on the switching valve 12 side of the pressure sensor 10b on the second liquid delivery flow path 8b which connects the pump unit 6b and the port d of the switching valve 12. Note that the dampers 22a and 22b are not essential constituent elements and not always necessary to be provided.

The rotor of the switching valve 12 is provided with two grooves for connecting adjacent ports. The two grooves are set to be longer than the length required to connect adjacent ports (for example, a length corresponding to 75 degrees), and are configured to switch the connection state to any one of the following states by rotating the rotor: the first state (state shown in FIG. 2), the second state (state shown in FIG. 3), the third state (state shown in FIG. 4), and the fourth state (state shown in FIG. 5).

Figure 2:
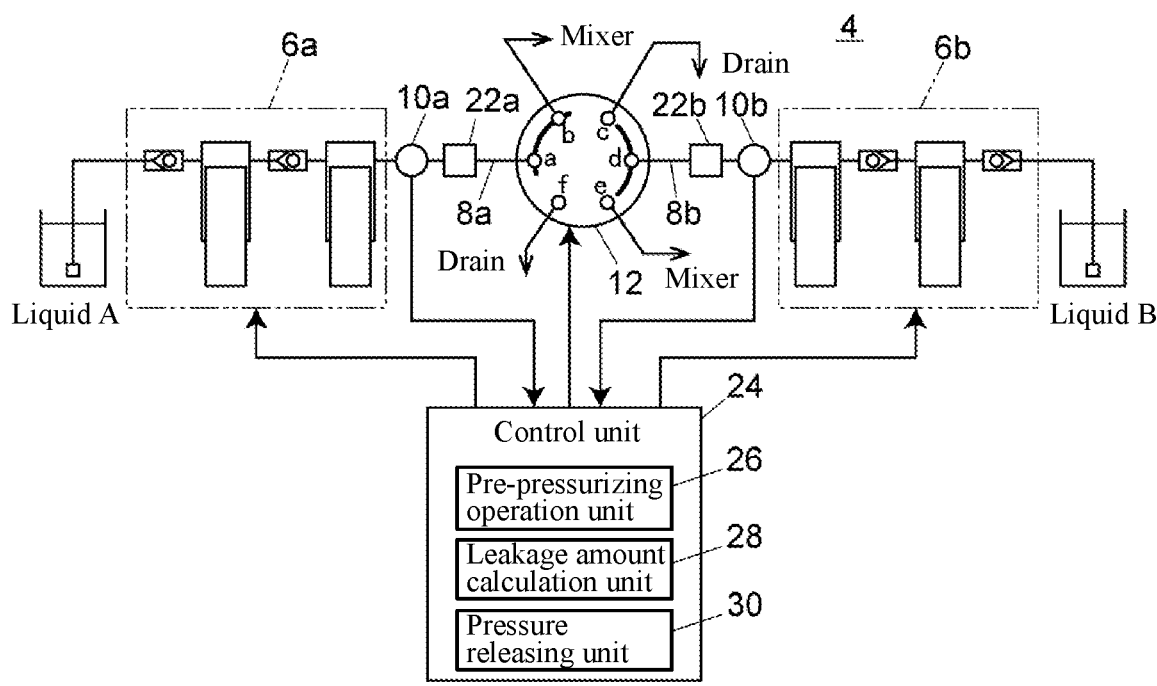
FIG. 2 is a diagram schematically showing an example of a configuration of a binary pump and is a configuration diagram when a switching valve is in a first state.

As shown in FIG. 2, when the switching valve 12 is in the first state, the ports a and b are connected so that the first liquid delivery flow path 8a is connected to the mixer 14, and the port d connected to the second liquid delivery flow path 8b is not connected to any port so that the downstream end of the second liquid delivery flow path 8b is in a closed state. The second liquid delivery flow path 8b is shut off from the mixer 14. Therefore, by switching the connection state to this first state at the time of delivering only the liquid A, it becomes possible to prevent the liquid A from flowing back toward the second liquid delivery flow path 8b.

Figure 3:
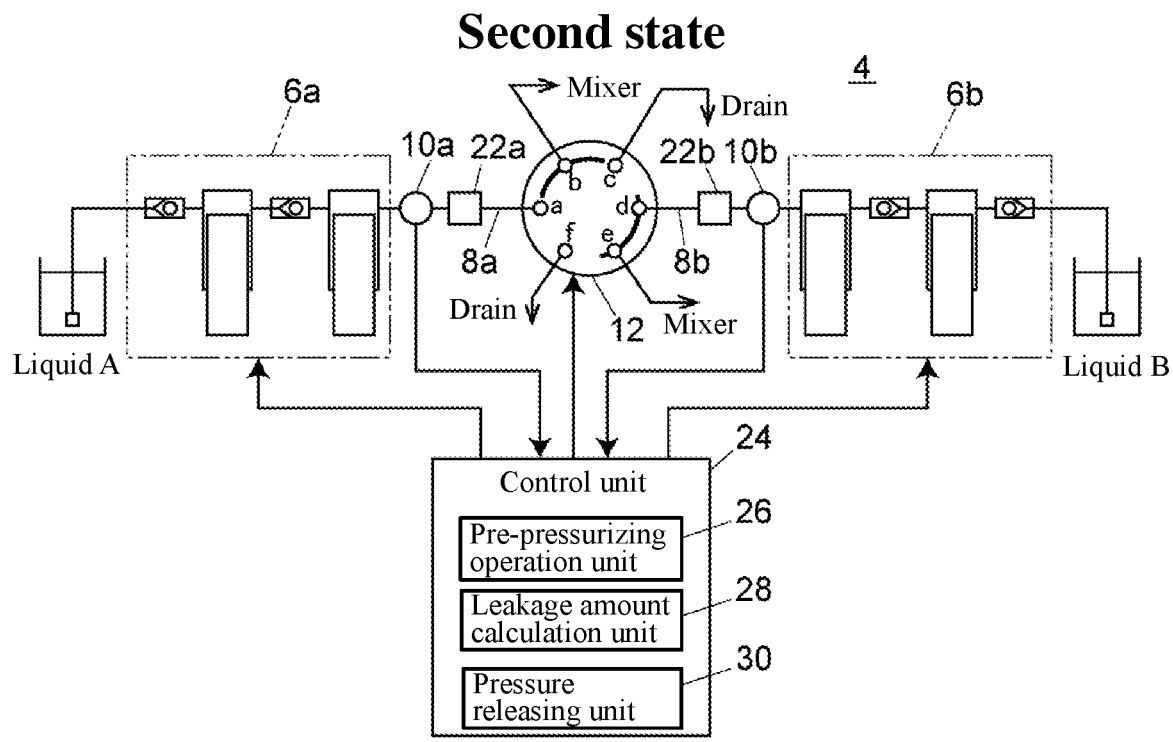
FIG. 3 is a configuration diagram when the switching valve of the binary pump is in a second state.

As shown in FIG. 3, when the switching valve 12 becomes in the second state, the ports d and e are connected, so that the second liquid delivery flow path 8b is connected to the mixer 14, and the port a connected to the first liquid delivery flow path 8a is not connected to any port, so that the downstream end of the first liquid delivery flow path 8a is in a closed state. The first liquid delivery flow path 8a is shut off from the mixer 14. Therefore, by switching the connection state to this second state at the time of delivering only the liquid B, it becomes possible to prevent the liquid B from flowing back toward the first liquid delivery flow path 8a.

Figure 4:
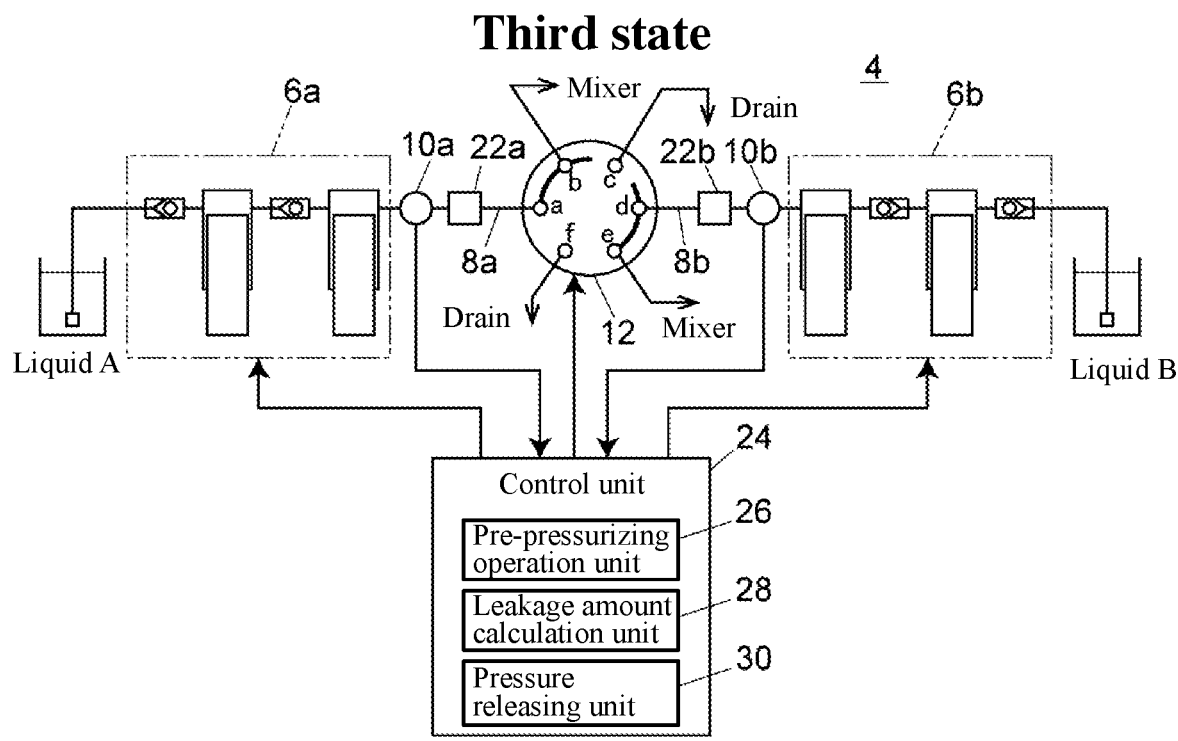
FIG. 4 is a configuration diagram when the switching valve of the binary pump is in a third state.

As shown in FIG. 4, when the switching valve 12 becomes the third state, the ports a and b are connected and the ports d and e are connected at the same time, so that both the first liquid delivery flow path 8a and the second liquid delivery flow path 8b are connected to the mixer 14. When the liquid A and the liquid B are delivered to the mixer 14 at the same time, the connection state becomes this third state.

Figure 5:
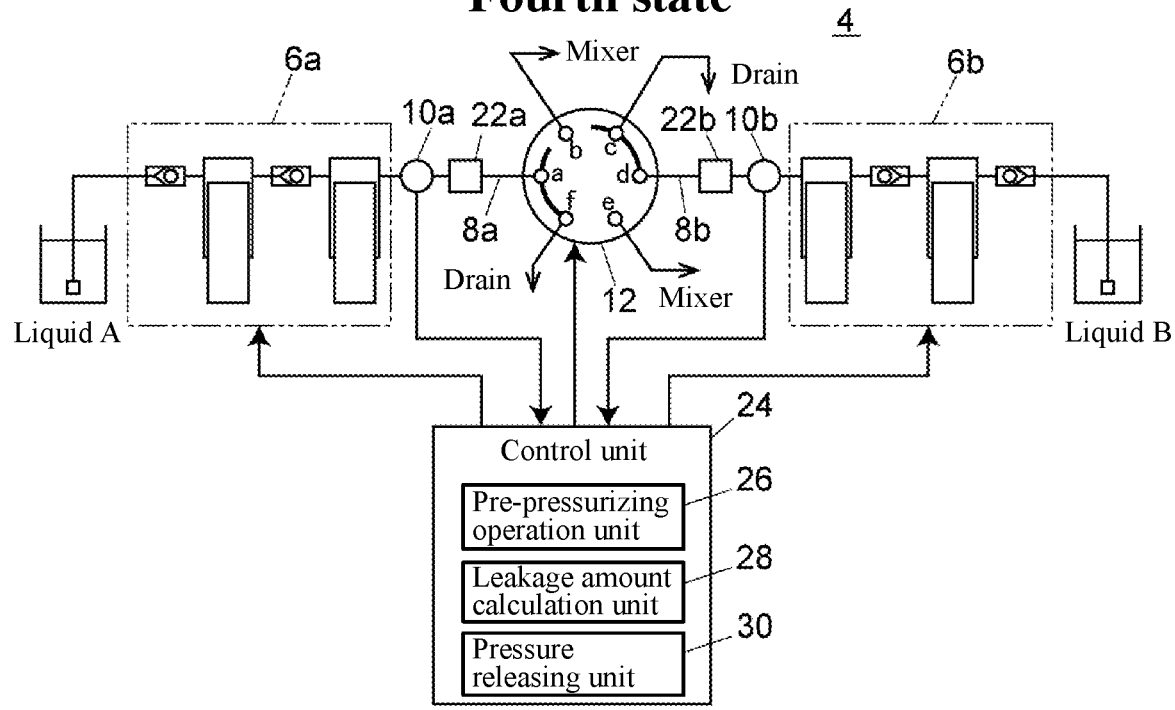
FIG. 5 is a configuration diagram when the switching valve of the binary pump is in a fourth state.

As shown in FIG. 5, when the switching valve 12 becomes the fourth state, the ports a and f are connected and the ports c and d are connected at the same time, so that both the first liquid delivery flow path 8a and the second liquid delivery flow path 8b are connected to the drain. By switching the connection state to this state, it is possible to perform purging in the first liquid delivery flow path 8a and the second liquid delivery flow path 8b.

The operation of the pump units 6a and 6b and that of the switching valve 12 are controlled by the control unit 24. The control unit 24 is configured to control the switching operation of the switching valve 12 and the operation speed of the pump units 6a and 6b based on the preset gradient program. The control unit 24 is provided with a pre-pressurizing operation unit 26, a leakage amount calculation unit 28, and a pressure releasing unit 30 as a function for performing operations, such as, e.g., a pre-pressurizing operation, detection of liquid leakage, calculation of leakage amount, and release of pressure, in addition to such a normal liquid delivery operation.

Note that the control unit 24 may be a dedicated computer provided in the binary pump 4, or it may be a dedicated computer or a general-purpose computer for comprehensively controlling a liquid chromatograph as a whole. The pre-pressurizing operation unit 26, the leakage amount calculation unit 28, and the pressure releasing unit 30 are functions obtained when an operation element, such as, e.g., a CPU, executes a program stored in a storage area provided in the control unit 24.

As described above, in the binary pump 4 of this embodiment, it is possible to execute two kinds of gradient modes: a mode in which the concentration of the liquid B is raised from the state in which the concentration of the liquid A is 100% and the concentration of liquid B is 0% and a mode in which the concentration of the liquid B is decreased from the state in which the concentration of the liquid B is 100% and the concentration of the liquid A is 0%.

In the mode in which the concentration of the liquid B is increased from the state in which the concentration of the liquid A is 100% and the concentration of the liquid B is 0%, while only the liquid A is initially being delivered, the switching valve 12 is set to the first state (FIG. 2) to cut off the connection between the second liquid delivery flow path 8b and the mixer 14. In this case, if the pressure in the second liquid delivery flow path 8b is lower than the pressure in the first liquid delivery flow path 8a, i.e., the system pressure, at the moment when the switching valve 12 is switched to the third state (FIG. 4) thereafter, the liquid A flows back toward the second liquid delivery flow path 8b side, causing a delay in the delivery of the liquid B. As a result, disorder may occur in the liquid delivery flow rate of the mobile phase, or the reproducibility of the mobile phase composition may decrease, resulting in the impaired reproducibility of the analysis result of the liquid chromatograph.

The above can also be applied in the mode in which the concentration of the liquid B is decreased from the state in which the concentration of the liquid B is 100% and the concentration of the liquid A is 0%. That is, while only the liquid B is initially being delivered, the switching valve 12 is switched to the second state (FIG. 3) to disconnect the connection between first liquid delivery flow path 8a and the mixer 14. In this case, if the pressure in the first liquid delivery flow path 8a is lower than the pressure in the second liquid delivery flow path 8b, i.e., the system pressure, at the moment when the switching valve 12 is switched to the third state (FIG. 4) thereafter, the liquid B flows back toward the first liquid delivery flow path 8a, causing a delay in the delivery of the liquid A.

In order to prevent the aforementioned problem, in this embodiment, a pre-pressurizing operation unit 26 is provided in the control unit 24. The pre-pressurizing operation unit 26 controls the operation of the pump unit 6a, 6b based on the output value of the pressure sensor 10a, 10b so that the pressure in the liquid delivery flow path 8a, 8b which is in the closed system by shutting off the connection with the mixer 14 is maintained at the same degree of pressure as the system pressure.

For example, when the switching valve 12 is in the first state and only the liquid A from the first pump unit 6a is being delivered to the mixer 14, the liquid delivery operation of the second pump unit 6b is controlled so that the pressure in the second liquid delivery flow path 8b detected by the second pressure sensor 10b becomes the same degree of pressure as the system pressure. In this case, the output value to be compared with the output value of the second pressure sensor 10b may be the output value of the first pressure sensor 10a, or may be the output value of another pressure sensor (not shown in the figures) provided separately from the first pressure sensor 10a and is configured to detect the system pressure at least when the switching valve 12 is in the first state.

To the contrary, when the switching valve 12 is in the second state and only the liquid B from the second pump unit 6b is being delivered to the mixer 14, the liquid delivery operation of the first pump unit 6a is controlled so that the pressure in the first liquid delivery flow path 8a detected by the first pressure sensor 10a becomes the same degree of pressure as the system pressure. In this case, the output value to be compared with the output value of the first pressure sensor 10a may be the output value of the second pressure sensor 10b, or may be the output value of another pressure sensor (not shown in the figures) provided separately from the second pressure sensor 10b and is configured to detect the system pressure at least when the switching valve 12 is in the second state.

It should be noted that the most preferred embodiment of the pre-pressurizing operation unit 26 is, as described in this embodiment, to make the pressure in the flow path 8a or 8b on the side of the closed system "the same degree of pressure" as the system pressure, but not necessarily limited to it. As long as the pressure in the flow path 8a or 8b on the side of the pump unit 6a or 6b which is in the offline state when the switching valve 12 is in the first state or the second state is brought closer to the system pressure, there is an effect of suppressing the backward flow of the liquid at the moment when the switching valve 12 is switched from the first state or the second state to the third state. For this reason, for example, 50% or more, preferably 70% or more, more preferably 90% or more of the system pressure may be set as the target value of the pre-pressurizing operation.

The leakage amount calculation unit 28 is configured to detect the liquid leakage and calculate the leakage amount based on the operation of the pump unit 6a, 6b during the pre-pressurizing operation. As mentioned above, the pump unit side in which the connection to the output port is blocked is in the closed system, so it is unlikely that the pressure spontaneously drops. Therefore, for example when the system pressure is constant, if the pump unit in which the connection to the output port is blocked is performing the pre-pressurizing operation to increase its system pressure, which means that the system pressure is decreasing spontaneously, which in turn indicates there occurs liquid leakage in that system.

Figure 10:
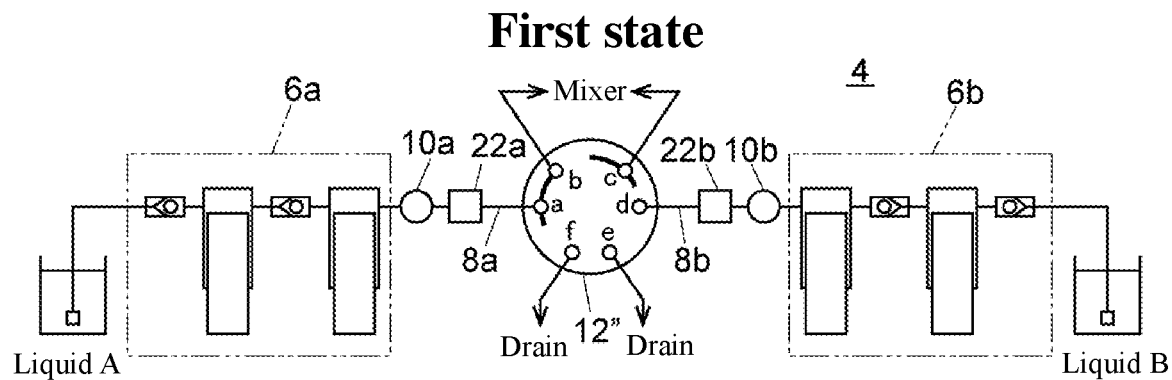
FIG. 10 is a diagram schematically showing another example of the configuration of the binary pump and is a configuration diagram when the switching valve is in the first state.
Figure 11:
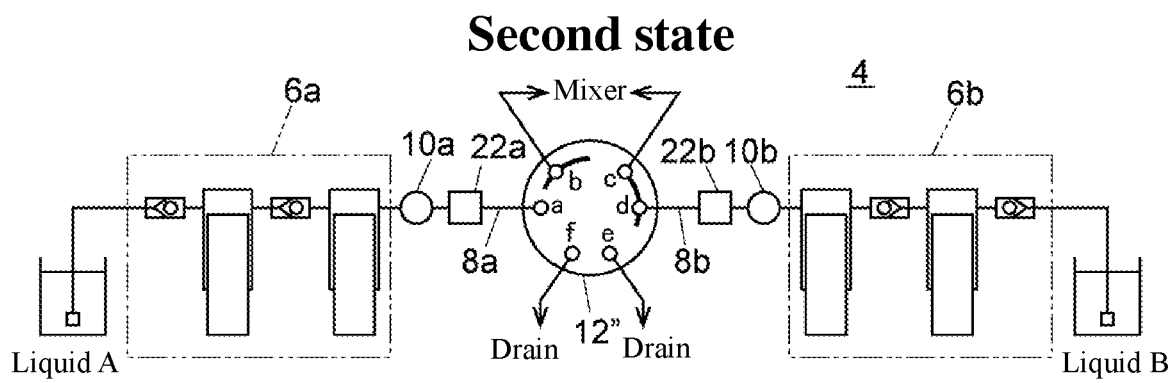
FIG. 11 is a configuration diagram when the switching valve of the binary pump is in the second state.
Figure 12:
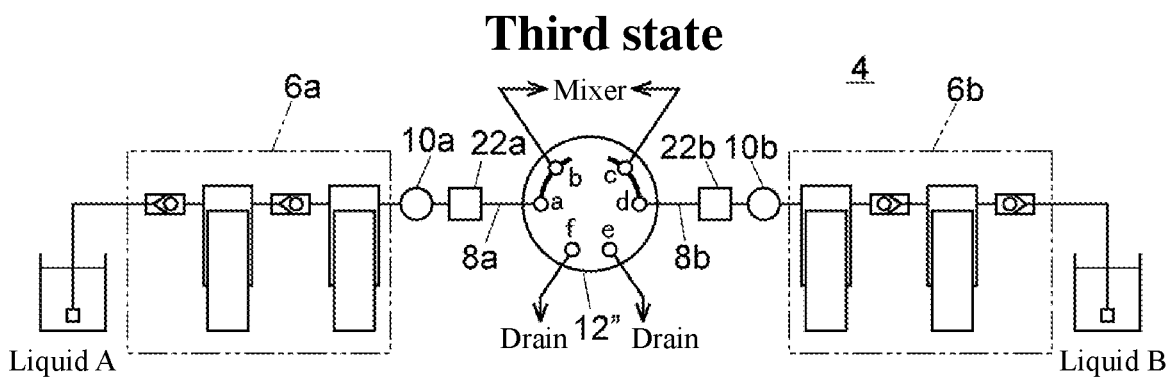
FIG. 12 is a configuration diagram when the switching valve of the binary pump is in the third state.
Figure 13:
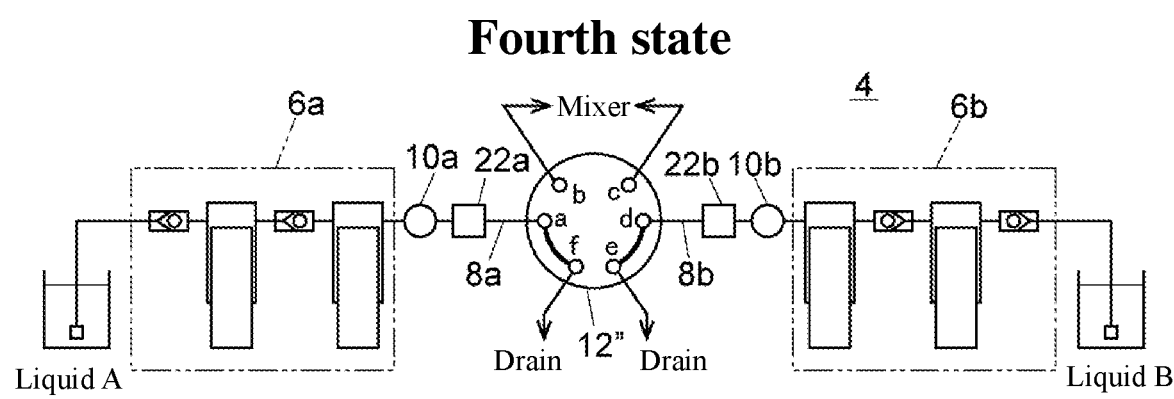
FIG. 13 is a configuration diagram when the switching valve of the binary pump is in the fourth state.

In any of the above gradient modes, at the state before starting the gradient liquid delivery, the state in which only the liquid A or only the liquid B is being delivered continues for a certain period of time (see FIG. 10 and FIG. 11). During this period of time, since the system pressure hardly fluctuates, after the pressure in the liquid delivery flow path 8a, 8b in which the connection to the mixer 14 is blocked becomes the same degree of pressure as the system pressure, the pre-pressurizing operation of the pump unit 6a, 6b will be terminated, so the pump unit 6a, 6b should hardly work. Nevertheless, when the pump unit 6a, 6b operates, it is considered that liquid leakage is occurring. Therefore, the leakage amount can be calculated based on the liquid delivery operation of the pump unit 6a, 6b at this period of time.

Note that there are cases where the system pressure decreases due to the liquid delivery condition, the liquid leakage in the analytical column 18, etc. In such a case, if the switching valve 12 is set to the first state or the second state and either one of the liquid delivery flow path 8 a and the liquid delivery flow path 8b is set to the closed system, the pressure in the liquid delivery flow path 8a or the liquid delivery flow path 8b may become higher than the system pressure in some cases. In this state, when the switching valve 12 is switched to the third state, the liquid in the liquid delivery flow path 8a, 8b in which the inner pressure becomes higher than the system pressure is suddenly delivered. Therefore, there is a problem that the liquid delivery flow rate of the mobile phase is disturbed or the accuracy of the composition of the mobile phase is impaired.

For this reason, the control unit 24 of this embodiment is provided with a pressure releasing unit 30. The pressure releasing unit 30 is configured to switch the switching valve 12 to the third state so that the liquid delivery flow path 8a, 8b does not become a closed system in cases where the system pressure continuously decreases or the pressure in the liquid delivery flow path 8a, 8b detected by the pressure sensor 10a, 10b is higher than the system pressure. When the switching valve 12 is in the third state, the liquid delivery flow paths 8a and 8b will not become the closed system. Therefore, the pressures in these flow paths 8a and 8b will not be maintained in a state higher than the system pressure.

In the configuration of the binary pump 4 shown in FIG. 2 to FIG. 5, the switching valve 12 is constituted by a 6-way valve and the liquid A and the liquid B are output to the mixer 14 via separate flow paths, but the present invention is not limited thereto. As shown in FIG. 6 to FIG. 9, the liquid A and the liquid B may be configured so as to be output to the mixer 14 via a common flow path.

The configuration of the binary pump 4 shown in FIG. 6 to FIG. 9 will be described. The switching valve 12' in this embodiment is constituted by a 4-port valve having four ports a to d. The rotor of the switching valve 12' is provided with only one groove for connecting ports. The groove has an arc shape corresponding to 180 degrees, so that three ports can be connected at the same time.

The port a of the switching valve 12' is connected to the first liquid delivery flow path 8a. The port b is connected to the flow path leading to the mixer. The port c is connected to the second liquid delivery flow path 8b. The port d is connected to the drain. The port a, the port b, and the port c are served as a first liquid delivery port, an output port, and a second liquid delivery port, respectively. In the same manner as in the switching valve 12 of the binary pump 4 shown in FIG. 2 to FIG. 5, this switching valve 12' can also switch the connection state to one of the first state to the fourth state.

Figure 6:
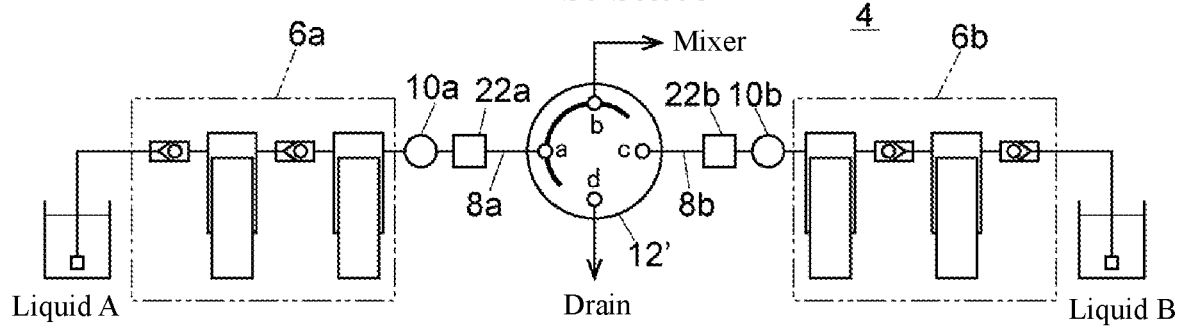
FIG. 6 is a diagram schematically showing another example of the configuration of the binary pump and is a configuration diagram when the switching valve is in the first state.

When the switching valve 12' becomes the first state, as shown in FIG. 6, the ports a and b are connected, so that the first liquid delivery flow path 8a is connected to the mixer 14. On the other hand, the port c to which the second liquid delivery flow path 8b is connected is not connected to any other port.

Figure 7:
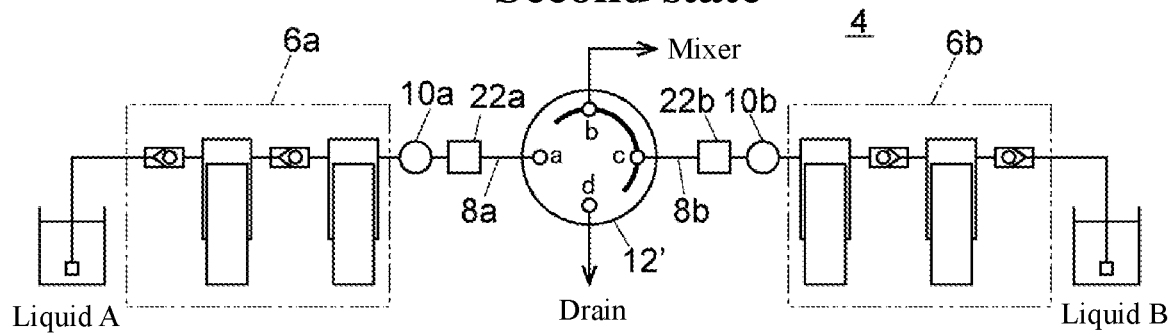
FIG. 7 is a configuration diagram when the switching valve of the binary pump is in the second state.
Figure 8:
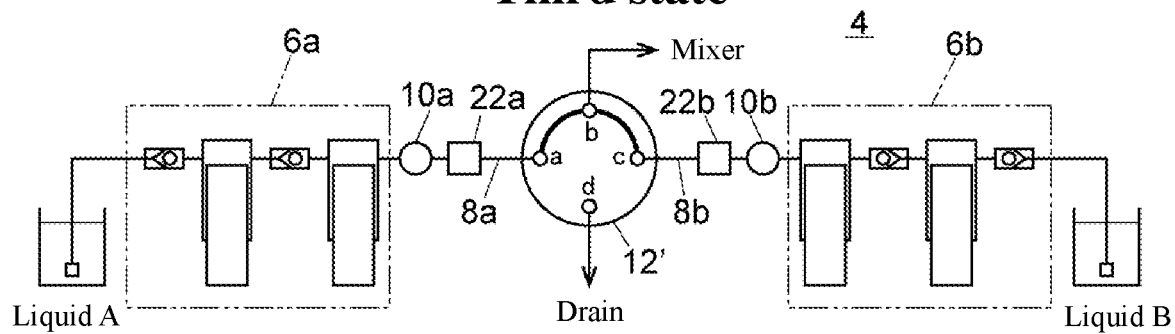
FIG. 8 is a configuration diagram when the switching valve of the binary pump is in the third state.
Figure 9:
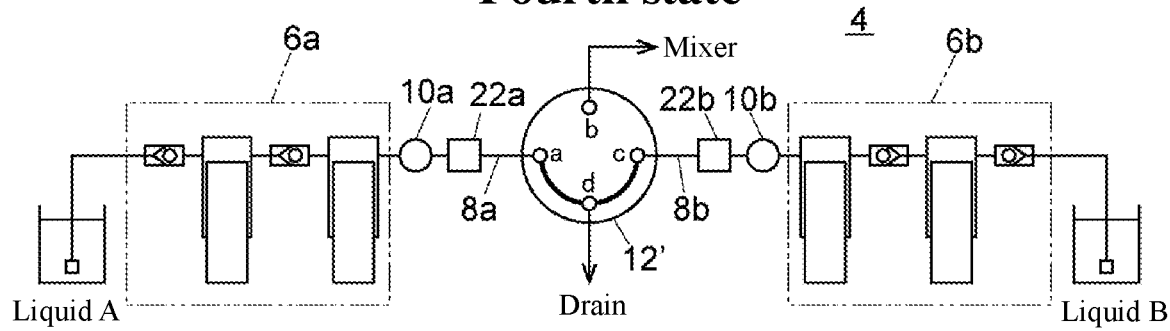
FIG. 9 is a configuration diagram when the switching valve of the binary pump is in the fourth state.

The state in which the rotor is rotated by 90 degrees clockwise from the first state is the second state. When the switching valve 12' becomes the second state, as shown in FIG. 7, the ports b and c are connected, so that the second liquid delivery flow path 8b is connected to the mixer 14. On the other hand, the port a to which the first liquid delivery flow path 8a is connected is not connected to any other port.

The state in which the rotor is rotated by 45 degrees clockwise from the first state or rotated by 45 degrees counterclockwise from the second state is the third state. When the switching valve 12' becomes in the third state, the ports a-b-c are connected simultaneously by one groove, so that the first liquid delivery flow path 8a and the second liquid delivery flow path 8b are connected to the mixer 14 via a common flow path.

The state in which the rotor is rotated by 180 degrees from the third state is the fourth state. When the switching valve 12' becomes in the fourth state, the ports a-d-c are connected simultaneously by one groove, so that the first liquid delivery flow path 8a and the second liquid delivery flow path 8b are connected to the drain.

As described above, even if a 4-port valve is used as the switching valve 12', it is possible to provide the same function as in cases where a 6-port valve is used as the switching valve 12.

In the above-described embodiments, a switching valve having ports evenly arranged on the same circumference is used as the switching valve 12, 12'. However, the present invention is not limited to this. A switching valve having ports unevenly arranged on the same circumference may also be used.

One embodiment of a binary pump 4 using a switching valve 12" in which ports are unevenly arranged on the same circumference is shown in FIG. 10 to FIG. 13.

The switching valve 12" in this embodiment has six ports a to f, the interval between the port a and the port b, the interval between the port c and the port d, the interval between the port f and port e are each 45 degrees, the interval between the port b and the port c is 90 degrees, and the interval between the port a and the port f, the interval between the port d and the port e are each 67.5 degrees. The port a is connected to the first liquid delivery flow path 8a, the port b and the port c are connected the flow path leading to the mixer 14, the port d is connected to the second liquid delivery flow path 8b, and the port e and port f are connected to respective drains. The port a is served as a first liquid delivery port, and the port d is served as a second liquid delivery port. Further, the port b is served as a first output port, and the port c is served as a second output port. These ports b and c are served as an output unit for outputting a liquid to the mixer 14.

The rotor of the switching valve 12" is provided with two grooves for connecting adjacent ports. Each of the two grooves has a length corresponding to 67.5 degrees which is the same as the interval between the port a and the port f and between the port d and the port e. The narrower interval between the grooves is 45 degrees, while the wider interval between the grooves is 180 degrees. Even if such a 6-port valve is used as the switching valve 12", the connection state can be switched to one of the first state (the state shown in FIG. 10), the second state (the state shown in FIG. 11), the third state (the state shown in FIG. 12), and the fourth state (the state shown in FIG. 13). The flow path configuration realized in each of the first to fourth states is the same as in the switching valve 12' described with reference to FIG. 2 to FIG. 5.

Figure 14:
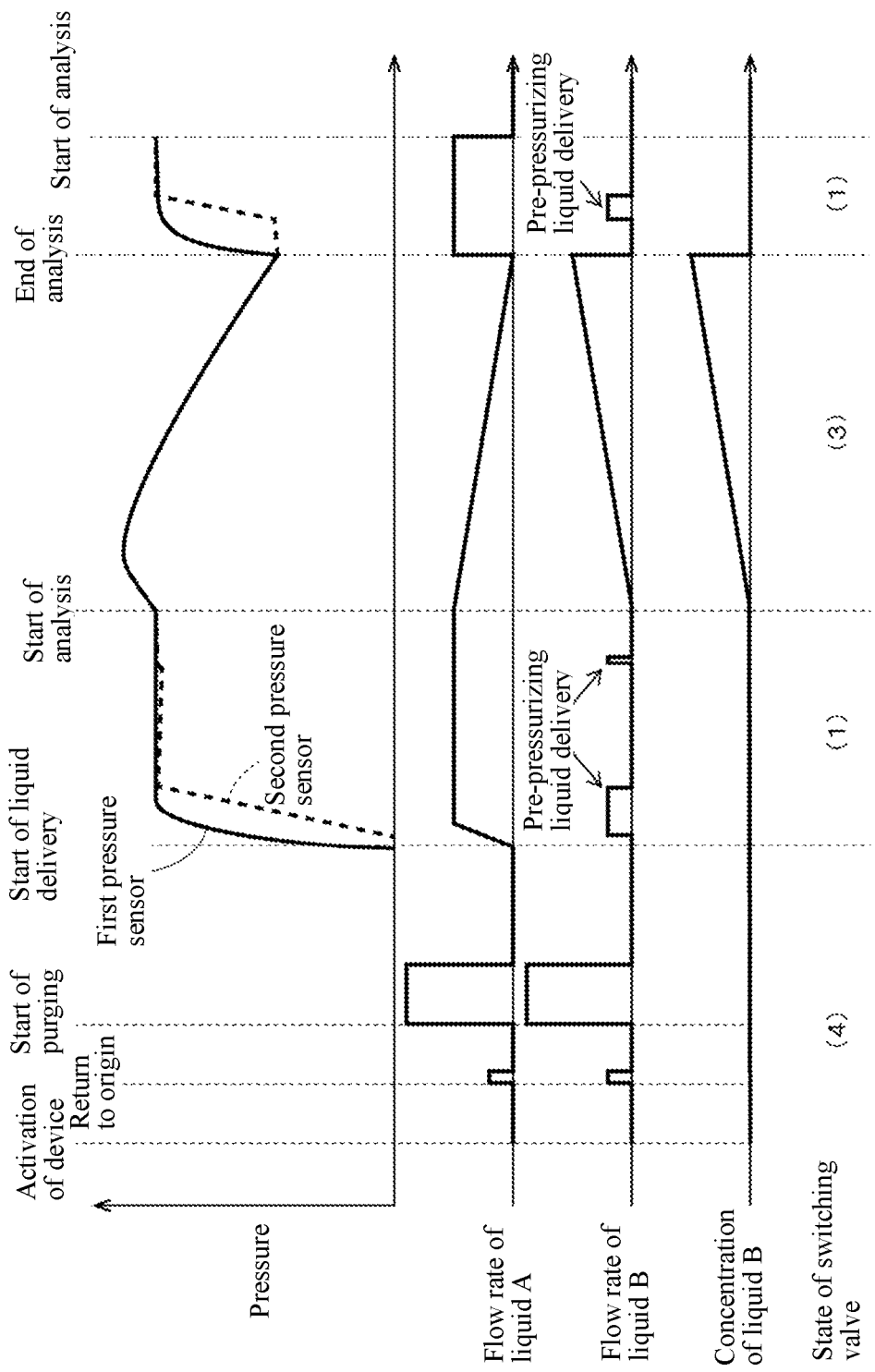
FIG. 14 is a graph for explaining an example of an analysis operation of the aforementioned embodiment showing a pressure, a flow rate of a liquid A, a flow rate of a liquid B, a concentration of the liquid B, and the temporal change of the state of the switching valve.
Figure 15:
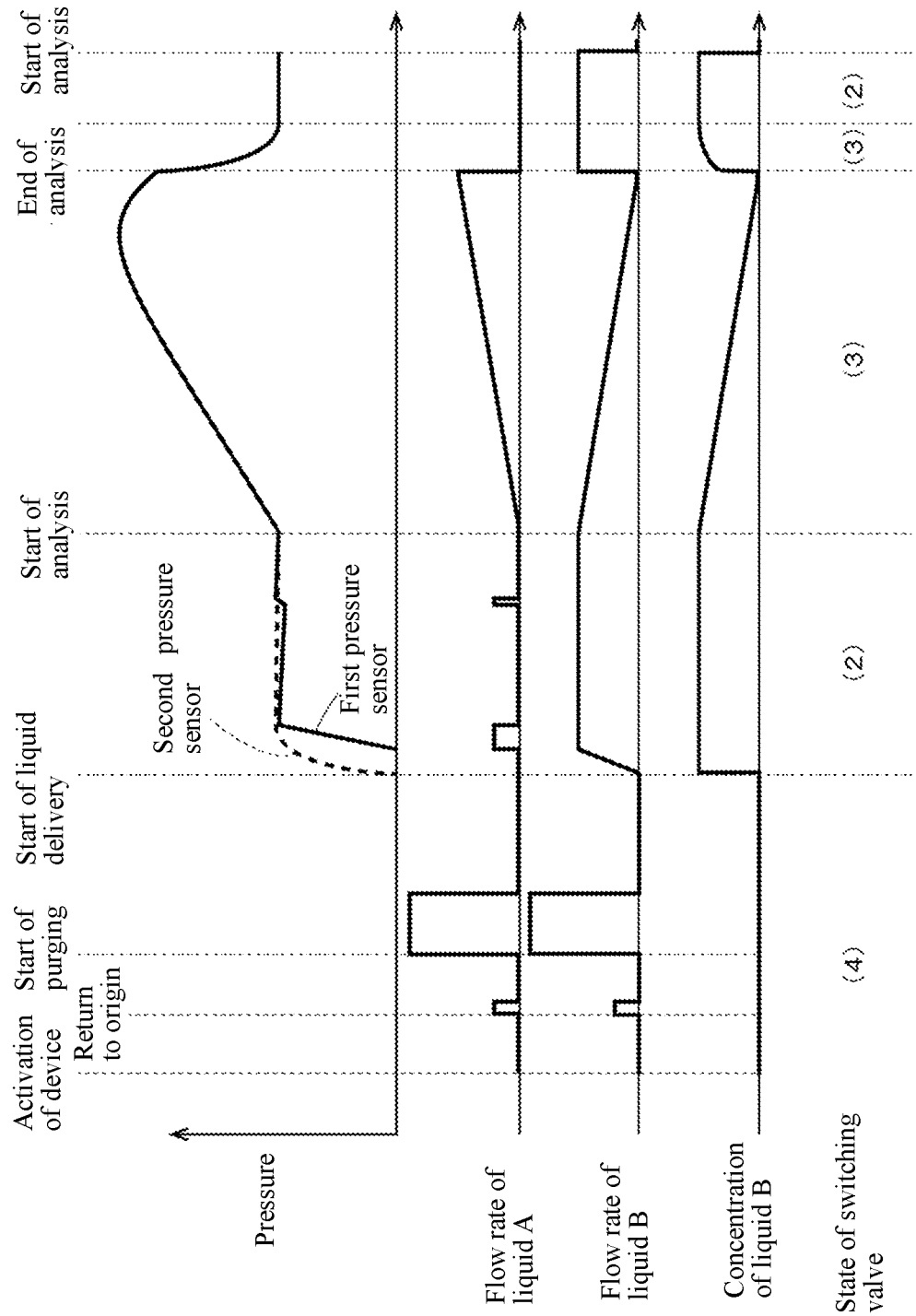
FIG. 15 is a graph for explaining another example of an analysis operation of the aforementioned embodiment showing a pressure, a flow rate of a liquid A, a flow rate of a liquid B, a concentration of the liquid B, and the temporal change of the state of the switching valve.

In each of the embodiments described above, the time changes of each system pressure, the flow rate of the liquid A, the flow rate of the liquid B, the concentration of the liquid B and the switching operation of the switching valve 12, 12", 12"' will be described with reference to FIG. 14 and FIG. 15. FIG. 14 shows the case of the gradient mode in which the concentration of the liquid B is increased from the state in which the concentration of the liquid A (aqueous solvent) is 100% and the concentration of the liquid B (organic solvent) is 0%, and FIG. 15 shows the case of the gradient mode in which the concentration of the liquid B is decreased from the state in which the concentration of the liquid B (organic solvent) is 100% and the concentration of the liquid A (aqueous solvent) is 0%. In these figures, the uppermost graph shows the output value (solid line) of the first pressure sensor 10a and the output value (broken line) of the second pressure sensor 10b. Below the graph, graphs showing the temporal changes of the flow rate of the liquid A, the flow rate of the liquid B, and the concentration of the liquid B are shown in order from the top. The state of the switching valve 12 is shown in parenthesis in the lowermost row. (1) denotes the first state (state shown in FIG. 2, FIG. 6 or FIG. 10), (2) denotes the second state (state shown in FIG. 3, FIG. 7, or FIG. 11), (3) denotes the third state (state shown in FIG. 4, FIG. 8, or FIG. 12), and (4) denotes the fourth state (the state shown in FIG. 5, FIG. 9, or FIG. 13).

Initially, the case of the gradient mode in which the concentration of the liquid B is increased from the state in which the concentration of the liquid A (aqueous solvent) is 100% and the concentration of the liquid B (organic solvent) is 0% will be described with reference to FIG. 14. After activating the device, the switching valve 12, 12", 12"' is switched to the fourth state, and the returning of the plunger position of each pump unit 6a, 6b to the original point and the purging in the liquid delivery flow paths 8a, 8b are executed. Thereafter, in order to start the liquid delivery of the mobile phase, first, the connection state is switched to the first state, so that the liquid A is delivered to the mixer 14 at the predetermined flow rate by the first pump unit 6a. After the liquid delivery flow rate of the liquid A is stabilized, the switching valve 12, 12", 12"' is switched to the third state, so that the liquid delivery of the liquid B is also initiated. Thus, the gradient analysis is initiated.

The second liquid delivery flow path 8b is in the closed system until the liquid delivery flow rate of the liquid A becomes stabilized. During this time, the pre-pressurizing operation (pre-pressurizing liquid delivery) of the pump unit 6b is performed so that the pressure in the second liquid delivery flow path 8b becomes the same degree of pressure as the system pressure. When the gradient analysis is initiated, the system pressure decreases since the concentration of the liquid B (organic solvent) which is less viscous than the liquid A (aqueous solvent) increases. After that, the gradient analysis is completed when the concentration of the liquid B reaches 100%.

When the gradient analysis is completed, the switching valve 12, 12", 12" is again switched to the first state, so that only the liquid A from the first pump unit 6a is delivered to the mixer 14. After the flow rate is stabilized, the switching valve 12, 12', 12" is again switched to the third state, and the next gradient analysis is initiated. Even until the connection state is switched from the first state to the third state, the pre-pressurizing operation (pre-pressurizing liquid delivery) of the pump unit 6b is performed so that the pressure in the second liquid delivery flow path 8b becomes the same degree of pressure as the system pressure.

Next, the case of the gradient mode in which the concentration of the liquid B is decreased from the state in which the concentration of the liquid B (organic solvent) is 100% and the concentration of the liquid A (aqueous solvent) is 0% will be described with reference to FIG. 15. Also in this case, the operation from the activation of the device to the start of the liquid delivery is the same as in the above-described case. In this mode, at the time of initiating the liquid delivery, the switching valve 12, 12', 12" is switched to the second state, so that only the liquid B from the second pump unit 6b will be delivered to the mixer 14 at a predetermined flow rate. After the liquid delivery flow rate of liquid B is stabilized, the switching valve 12, 12', 12" will be switched to the third state, so that the liquid delivery of the liquid A is also initiated. Thus, the gradient analysis is initiated.

The first liquid delivery flow path 8a is in the closed system until the liquid delivery flow rate of the liquid B becomes stabilized. During this time, the pre-pressurizing operation (pre-pressurizing liquid delivery) of the pump unit 6a is performed so that the pressure in the first liquid delivery flow path 8a becomes the same degree of pressure as the system pressure. When the gradient analysis is initiated, the system pressure increases since the concentration of the liquid A (aqueous solvent), which is higher in viscosity than the liquid B (organic solvent) increases. Thereafter, when the concentration of the liquid B becomes 0%, the operation of the pump unit 6a is stopped and the gradient analysis is terminated.

Immediately after stopping the operation of the pump unit 6a, the liquid A which is in a compressed state remains in the damper 22a of the first liquid delivery flow path 8a. Therefore, when the switching valve 12, 12", 12" is switched to the second state immediately after stopping the operation of the pump unit 6a, the pressure in the first liquid delivery flow path 8a will be maintained in a high state. On the other hand, when the liquid delivery of the liquid A from the pump unit 6a is stopped and the connection state becomes the state in which only the liquid B is delivered from the pump unit 6b, the system pressure decreases. As a result, if the switching valve 12, 12', 12" is switched to the second state immediately after stopping the operation of the pump unit 6a, the pressure in the first liquid delivery flow path 8a will be maintained at a state higher than the system pressure. Therefore, when the switching valve 12, 12', 12" is switched to the third state next, the liquid A in the first liquid delivery flow path 8a will be suddenly delivered to the mixer 14 due to the pressure difference.

Therefore, in this mode, even after the gradient analysis is completed and the operation of the first pump unit 6a is stopped, the switching valve 12, 12', 12" is maintained in the third state to release the pressure in the first liquid delivery flow path 8a. After the pressure in the first liquid delivery flow path 8a is released and stabilized, the switching valve 12, 12', 12" is switched to the second state.

Note that the embodiments of the switching valve, the binary pump, and the liquid chromatograph described above are merely examples, and the present invention is not limited thereto. In the above embodiments, the switching valve is realized by a 6-way valve or a 4-way valve, but it is not always necessary to have such a configuration. As the switching valve, as long as it is configured so that it can be selectively switched to any one of states: a first state in which the first liquid delivery port is connected to the output port; a second state in which the second liquid delivery port is connected to the output port, and a third state in which both the first liquid delivery port and the second liquid delivery port are connected to the output port, any configuration may be employed.

DESCRIPTION OF REFERENCE SYMBOLS 2 analysis flow path
4 binary pump
6a first pump unit
6b second pump unit
8a first liquid delivery flow path
8b second liquid delivery flow path
10a first pressure sensor
10b second pressure sensor
12 switching valve
14 mixer
16 sample injection unit
18 analytical column
20 detector
22 damper
24 control unit
26 pre-pressurizing operation unit
28 leakage amount calculation unit
30 pressure releasing unit

The invention claimed is:

1. A binary pump for a chromatograph comprising:
a first pump unit provided with an inlet and an outlet, the inlet of the first pump unit being connected to a container containing a liquid;
a second pump unit provided separately from the first pump unit and provided with an inlet and an outlet, the inlet of the second pump unit being connected to a container containing a liquid;
a switching valve provided with a plurality of ports, the plurality of ports including a first liquid delivery port to which the outlet of the first pump unit is connected, a second liquid delivery port to which the outlet of the second pump unit is connected, and at least one output port for outputting a liquid to be delivered, and configured to switch to the following states: a first state in which the first liquid delivery port is connected to the at least one output port and the second liquid delivery port is not connected to any port; a second state in which the second liquid delivery port is connected to the at least one output port and the first liquid delivery port is not connected to any port; and a third state in which both the first liquid delivery port and the second liquid delivery port are connected to the at least one output port; and a control unit configured to prevent a liquid from flowing back toward the second pump unit from the output port by switching the switching valve to the first state at a time of delivering liquid by only the first pump unit, and to prevent a liquid from flowing back toward the first pump unit from the output port by switching the switching valve to the second state at a time of delivering liquid by only the second pump unit.

2. The binary pump for the chromatograph as recited in claim 1,
wherein the switching valve is configured to be switched between the first state and the third state without interrupting a connection between the first liquid delivery port and the output port, and
wherein the switching valve is configured to be switched between the second state and the third state without interrupting a connection between the second liquid delivery port and the output port.

3. The binary pump for the chromatograph as recited in claim 1,
wherein a first output port and a second output port are provided as the output port, and
wherein the switching valve is configured such that the first liquid delivery port is connected to the first output port in the first state and the third state, and the second liquid delivery port is connected to the second output port in the second state and the third state.

4. The binary pump for the chromatograph as recited in claim 1,
wherein the switching valve further comprises a drain port leading to a drain, and
wherein the switching valve is configured to be switched to a fourth state in which at least either the first liquid delivery port or the second liquid delivery port is connected to the drain port.

5. The binary pump for the chromatograph as recited in claim 1, further comprising:
a first pressure sensor configured to detect a pressure in a space existing between the first pump unit and the switching valve; and
a second pressure sensor configured to detect a pressure in a space existing between the second pump unit and the switching valve.

6. A binary pump for chromatograph comprising:
a first pump unit;
a second pump unit provided separately from the first pump unit;
a switching valve provided with a plurality of ports, the plurality of ports including a first liquid delivery port to which the first pump unit is connected, a second liquid delivery port to which the second pump unit is connected, and at least one output port for outputting a liquid to be delivered, and configured to switch to any one of the following states: a first state in which the first liquid delivery port is connected to the output port and the second liquid delivery port is not connected to any port; a second state in which the second liquid delivery port is connected to the output port and the first liquid delivery port is not connected to any port of the plurality of ports; and a third state in which both the first liquid delivery port and the second liquid delivery port are connected to the output port; and
a control unit configured to prevent a liquid from flowing back toward the second pump unit from the output port by switching the switching valve to the first state at a time of delivering liquid by only the first pump unit, and to prevent a liquid from flowing back toward the first pump unit from the output port by switching the switching valve to the second state at a time of delivering liquid by only the second pump unit,
the binary pump further comprising:
a first pressure sensor configured to detect a pressure in a space existing between the first pump unit and the switching valve; and
a second pressure sensor configured to detect a pressure in a space existing between the second pump unit and the switching valve,
wherein the control unit comprises:
a pre-pressurizing operation unit,
wherein the pre-pressurizing operation unit is configured to operate the first pump unit based on an output of the first pressure sensor so that the pressure detected by the first pressure sensor approaches a system pressure, which is a pressure downstream of the output port, in the second state, and operate the second pump unit based on an output of the second pressure sensor so that the pressure detected by the second pressure sensor approaches the system pressure in the first state.

7. The binary pump for the chromatograph as recited in claim 6,
wherein the pre-pressurizing operation unit is configured to operate the first pump unit based on the output of the first pressure sensor so that the pressure detected by the first pressure sensor becomes approximately the same as the system pressure in the second state, and operate the second pump unit based on the output of the second pressure sensor so that the pressure detected by the second pressure sensor becomes approximately the same as the system pressure detected by the first pressure sensor in the first state.

8. The binary pump for the chromatograph as recited in claim 6, wherein the control unit comprises:
a leakage amount calculation unit configured to calculate a leakage amount based on an operation of the first pump unit or the second pump unit that performs a pre-pressurizing operation.

9. The binary pump for the chromatograph as recited in claim 8,
wherein the leakage amount calculation unit is configured to issue a warning when the leakage amount calculation unit determines that the leakage amount exceeds a preset threshold value.

10. The binary pump for the chromatograph as recited in claim 5, wherein the control unit comprises:
a pressure releasing unit,
wherein the pressure releasing unit is configured to switch the switching valve to the third state when the system pressure decreases continuously, when the pressure detected by the first pressure sensor is greater than the system pressure, or when the pressure detected by the second pressure sensor is greater than the system pressure.

11. A liquid chromatograph comprising:
an analysis flow path;
a binary pump for a chromatograph, the binary pump being configured to deliver a mobile phase in the analysis flow path;
a sample injection unit provided on a downstream side of the binary pump on the analysis flow path and configured to inject a sample into the analysis flow path;
an analytical column provided on a further downstream side of the sample injection unit on the analysis flow path and configured to separate the sample injected into the analysis flow path by the sample injection unit for each component; and a detector provided on a further downstream side of the analytical column on the analysis flow path and configured to detect a component separated by the analytical column, wherein the binary bump comprises:
- a first pump unit provided with an inlet and an outlet, the inlet of the first pump unit being connected to a container containing a liquid;
- a second pump unit provided separately from the first pump unit and provided with an inlet and an outlet, the inlet of the second pump unit being connected to a container containing a liquid;
- an output unit configured to output a liquid to be delivered;
- a switching valve provided with a plurality of ports, the plurality of ports including a first liquid delivery port to which the outlet of the first pump unit is connected, a second liquid delivery port to which the outlet of the second pump unit is connected, and an output port leading to the output unit, and configured to switch to the following states: a first state in which the first liquid delivery port is connected to the output port and the second liquid delivery port is not connected to any port; a second state in which the second liquid delivery port is connected to the output port and the first liquid delivery port is not connected to any port of the plurality of ports; and a third state in which both the first liquid delivery port and the second liquid delivery port are connected to the output port; and
- a control unit configured to prevent a liquid from flowing back toward the second pump unit from the output port by switching the switching valve to the first state at a time of delivering liquid by only the first pump unit, and to prevent a liquid from flowing back toward the first pump unit from the output port by switching the switching valve to the second state at a time of delivering liquid by only the second pump unit.

* * * * *